US010558235B1

(12) United States Patent
Levay et al.

(10) Patent No.: US 10,558,235 B1
(45) Date of Patent: Feb. 11, 2020

(54) REFLECTOR-BASED ILLUMINATION FOR A GLOW CASTING BORDER

(71) Applicants: Denso International America, Inc., Southfield, MI (US); Denso Corporation, Kariya, Aichi-pref. (JP)

(72) Inventors: Christopher Ryan Levay, Grand Rapids, MI (US); Jesse John Moellers, Novi, MI (US); Praveenkumar Hanakuntimath, Farmington, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/417,955

(22) Filed: May 21, 2019

(51) Int. Cl.
*B60Q 3/14* (2017.01)
*B60Q 3/16* (2017.01)
*G05G 1/10* (2006.01)

(52) U.S. Cl.
CPC .............. *G05G 1/105* (2013.01); *B60Q 3/14* (2017.02); *B60Q 3/16* (2017.02)

(58) Field of Classification Search
CPC ... B60Q 3/00; B60Q 3/14; B60Q 3/16; G05G 1/10; G05G 1/105
See application file for complete search history.

(56) References Cited

U.S. PATENT DOCUMENTS

| 3,739,512 | A | * | 6/1973 | Ruppert | G01P 1/08 40/546 |
| 6,334,688 | B1 | * | 1/2002 | Niwa | G05G 1/105 362/23.01 |
| 2006/0238994 | A1 | | 10/2006 | Chery et al. | |
| 2006/0274526 | A1 | * | 12/2006 | Weston | G09F 13/04 362/249.16 |
| 2009/0080176 | A1 | * | 3/2009 | Claprood | G01D 11/28 362/23.07 |
| 2011/0056380 | A1 | | 3/2011 | Kim et al. | |

FOREIGN PATENT DOCUMENTS

DE 102008042472 A1 4/2010
KR 100782571 B1 12/2007

* cited by examiner

*Primary Examiner* — Thai Pham (57) ABSTRACT

A border assembly includes a semi-tubular reflector segment and a semi-tubular diffuser segment in front of the reflector segment. The reflector segment includes an inner sidewall and an outer sidewall, and a cavity therebetween. The cavity includes a backspace midway along the reflector segment and a front exit spaced therefrom. The reflector segment is configured, in relation to light emanated from the backspace, to discharge light originating from the emanated light through the front exit all along the reflector segment with a regular intensity, with the discharged light including reflections of the emanated light off the outer sidewall. The diffuser segment includes a back face positioned over the front exit and a front face spaced therefrom. The diffuser segment is configured to diffusively transmit the discharged light, resulting in the front face casting a glow.

20 Claims, 3 Drawing Sheets

REFLECTOR-BASED ILLUMINATION FOR A GLOW CASTING BORDER

TECHNICAL FIELD

The embodiments disclosed herein relate to user controls and, more particularly, to borders for user controls that are configured to cast glows.

BACKGROUND

Many of today's vehicles are equipped with user controls. Some vehicles include borders for the user controls that are configured to cast glows. The glows serve as functional decorations for the user controls. For instance, the glows may attractively signal the locations of the user controls in low light conditions.

SUMMARY

Disclosed herein are embodiments of a border assembly and associated items for reflector-based illumination for a glow casting border for a user control. In one aspect, a border assembly includes a semi-tubular reflector segment and a semi-tubular diffuser segment in front of the reflector segment. The reflector segment includes an inner sidewall and an outer sidewall, and a cavity therebetween. The cavity includes a backspace midway along the reflector segment and a front exit spaced therefrom. The reflector segment is configured, in relation to light emanated from the backspace, to discharge light originating from the emanated light through the front exit all along the reflector segment with a regular intensity, with the discharged light including reflections of the emanated light off the outer sidewall. The diffuser segment includes a back face positioned over the front exit and a front face spaced therefrom. The diffuser segment is configured to diffusively transmit the discharged light, resulting in the front face casting a glow.

In another aspect, a control unit includes a user control, and a border assembly for the user control. The border assembly includes a total of two light sources, a tubular reflector in front of the light sources, and a tubular diffuser in front of the reflector. The light sources are operable to emanate light. The reflector includes an inner sidewall standing behind the light sources and an outer sidewall standing around the light sources, and a cavity therebetween. The cavity accommodates the light sources and includes a front exit spaced therefrom. The reflector is configured to discharge light originating from the emanated light through the front exit all along the reflector with a regular intensity, with the discharged light including reflections of the emanated light off the outer sidewall. The diffuser includes a back face positioned over the front exit and a front face spaced therefrom rendering a border for the user control. The diffuser is configured to diffusively transmit the discharged light, resulting in the front face casting a glow.

In yet another aspect, a border assembly includes a tubular reflector, and a tubular diffuser in front of the reflector. The reflector includes an inner sidewall and an outer sidewall, a cavity therebetween, and blockers in the cavity. The cavity includes backspaces for accommodating a total of two light sources and a front exit spaced therefrom. The backspaces are biased toward the inner sidewall, and the blockers extend from the inner sidewall to overhang the backspaces. The reflector is configured, in relation to light emanated from the backspaces, to discharge light originating from the emanated light through the front exit all along the reflector with a regular intensity. With the blockers blocking the emanated light and reflections of the emanated light off the inner sidewall from the front exit, the discharged light includes only reflections of the emanated light off the outer sidewall. The diffuser includes a back face positioned over the front exit and a front face spaced therefrom. The diffuser is configured to diffusively transmit the discharged light, resulting in the front face casting a glow.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a border assembly and associated items for reflector-based illumination for a glow casting border for a user control. The border assembly includes light sources for emanating light, a reflector for discharging light originating from the emanated light, including reflections of the emanated light, and a diffuser, which includes a front face rendering the border, for diffusively transmitting the discharged light, resulting in the front face casting a glow. The reflector, in a double wall configuration, includes an inner sidewall and an outer sidewall, and a cavity therebetween with backspaces for the light sources and a front exit for the discharged light.

Among other objectives, the configuration of the border assembly and, more particularly, the configuration of the reflector in relation to the discharged light, promotes the front face casting the glow all along the diffuser with a regular intensity. For instance, the discharged light may include only reflections of the emanated light, including only reflections of the emanated light off the outer sidewall. Moreover, reflections of the emanated light off the outer sidewall may be concentrated to a narrowed band of the front exit adjacent the outer sidewall. Moreover, the discharged light may include reflections of the emanated light off the outer sidewall along the reflector midway between the light sources. Moreover, the discharged light may include a combination of diffuse reflections of the emanated light off the outer sidewall and spectral reflections of the emanated light off the outer sidewall.

Figure 1A:
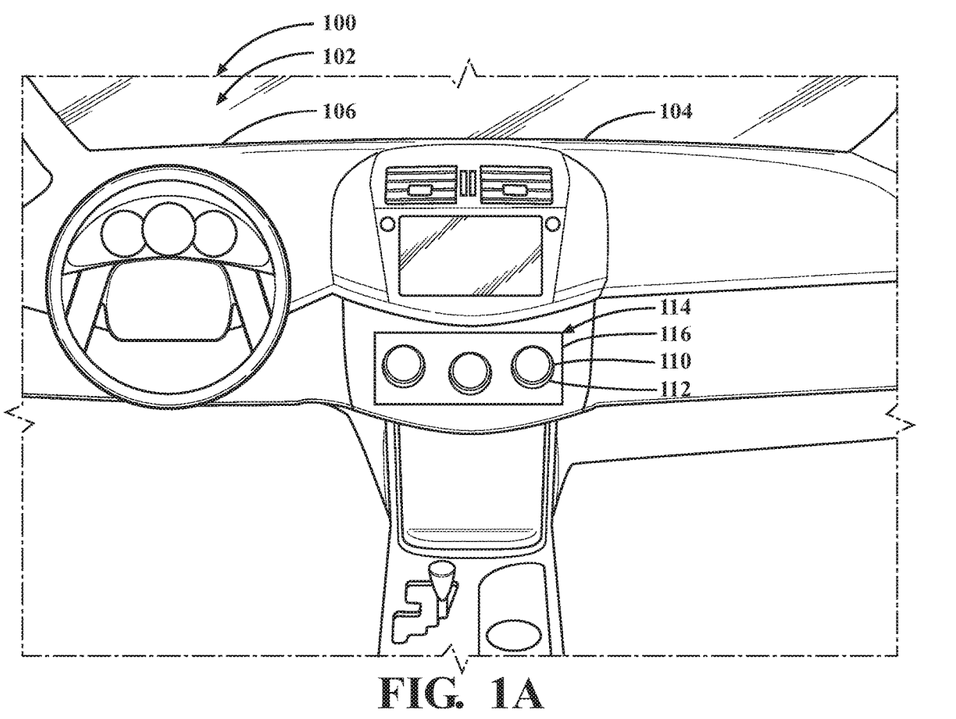
FIG. 1A is a user view of a vehicle from inside the vehicle's passenger compartment, showing a control unit that includes user controls and borders for the user controls that are configured to cast glows.

A representative vehicle 100 is shown in FIG. 1A. The vehicle 100 has an exterior and a number of interior compartments. The compartments include a passenger compartment 102, as well as an engine compartment, a stowage compartment and the like. The vehicle 100 may include, among other things, a dash assembly 104, an instrument panel 106 and the like housed in the passenger compartment 102, as well as consoles, seats, armrests and the like. Moreover, the vehicle 100 includes one or more manually-operable user controls 110 and one or more corresponding borders 112 for the user controls 110 housed in the passenger compartment 102.

The user controls 110 serve as interfaces between users of the vehicle 100 and the vehicle 100 itself, and are operable to receive one or more mechanical or other user inputs. One, some or all of the user controls 110 may, as shown, be rotary knobs, rotary dials and the like. Additionally, or alternatively, one, some or all of the user controls 110 may be push buttons, capacitive buttons, switches and the like. In conjunction with corresponding user controls 110, the vehicle 100 may include one or more sensors operable to detect user inputs received by the user controls 110.

The borders 112 ring or otherwise border the user controls 110. Also called glow rings, the borders 112, in association with illumination items behind the borders 112, are glow casting or, in other words, configured to cast glows. Like the borders 112, the glows ring or otherwise border the user controls 110, from where they serve as functional decorations therefor. For instance, the glows may attractively signal the locations of the user controls 110 in low light conditions.

In a representative example of an anticipated use case therefor, the vehicle 100 includes the user controls 110, the borders 112 and associated illumination items behind the borders 112 as part of a control unit 114 housed in the passenger compartment 102. The control unit 114 is part of, mounted to or otherwise supported by the dash assembly 104. In the vehicle 100, the control unit 114 may serve as a centralized control unit for any combination of a heating/cooling system, an infotainment system, a lighting system and like user-controlled systems typical of vehicles. The control unit 114 includes a fascia 116 on the dash assembly 104, and supports the user controls 110 and the borders 112 on the fascia 116 and, by extension, on the dash assembly 104. Although this description follows with reference to the user controls 110 and the borders 112 being on the fascia 116 as part of the control unit 114, it will be understood that this disclosure is applicable in principle to otherwise similar vehicles including the user controls 110 and the borders 112 otherwise on user-facing vehicular surfaces, including but not limited to otherwise on dash assemblies.

Figure 1B:
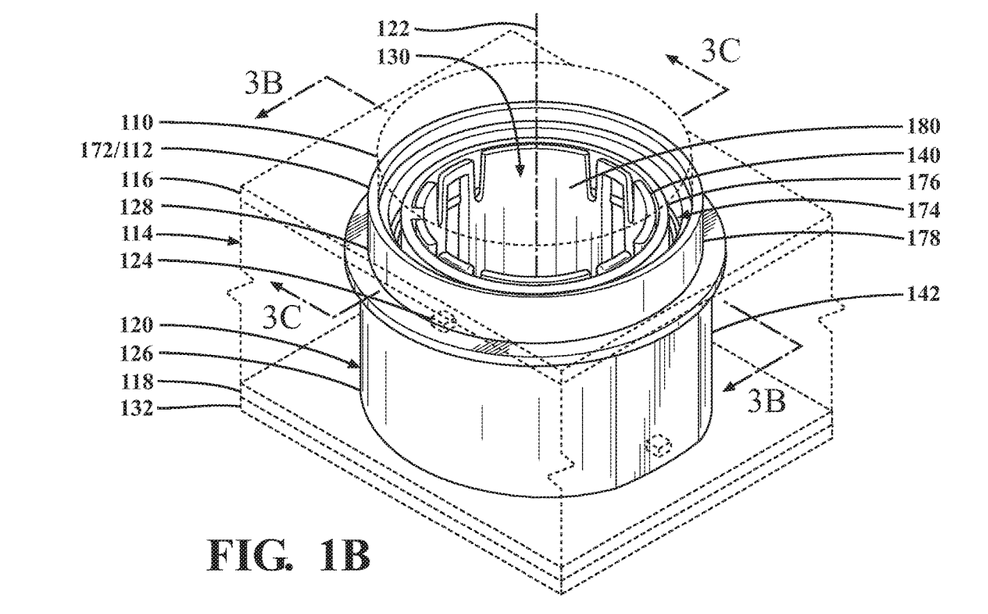
FIG. 1B is a partial perspective view of the control unit showing, for a representative user control and border, a border assembly that includes light sources for emanating light, a reflector for discharging reflections of the emanated light, and a diffuser, which renders the border, for diffusively transmitting the discharged light, resulting in the border casting a glow.

As shown with additional reference to FIG. 1B for a representative user control 110 and border 112, the control unit 114 includes a circuit board 118, the fascia 116, the user control 110 and the border 112. In the control unit 114, the user control 110 is connected with the circuit board 118. Relatedly, the circuit board 118 is operable to detect user inputs received by the user control 110. For instance, the user control 110 may be connected with a sensor on the circuit board 118 operable to detect user inputs received by the user control 110.

Moreover, the control unit 114 includes a border assembly 120 for rendering the border 112 and including associated illumination items behind the border 112. The border assembly 120 has an axis 122 that, with the user control 110 being a rotary knob, is coincident with the axis of rotation for the user control 110. Along the axis 122, the control unit 114 includes the circuit board 118 and the fascia 116 in an axially spaced relationship with one another, and the border assembly 120 between the circuit board 118 and the fascia 116. From between the circuit board 118 and the fascia 116, the border assembly 120 includes one or more light sources 124 on the circuit board 118 for emanating light. Moreover, the border assembly 120 includes a tubular reflector 126 in front of the light sources 124 for discharging light originating from the emanated light, including reflections of the emanated light. Moreover, the border assembly 120 includes a tubular diffuser 128 in front of the reflector 126 that, from about the user control 110 on the fascia 116, renders the border 112, for diffusively transmitting the discharged light, resulting in the border 112 casting a glow. As shown, the border assembly 120 includes multiple light sources 124 that are circumferentially-spaced about the axis 122. With the axis 122 serving as the axial center thereof, the circumferential spacing of the light sources 124, the reflector 126 and the diffuser 128 are axially aligned with one another along the axis 122.

In the control unit 114, the light sources 124 are part of, mounted to or otherwise supported by the circuit board 118. Relatedly, the circuit board 118 is operable to power the light sources 124. Moreover, the border assembly 120 includes a passage 130 for connecting the user control 110 with the circuit board 118 therethrough, including through the reflector 126 and through the diffuser 128.

In addition to the circuit board 118, the light sources 124, the reflector 126, the diffuser 128, the fascia 116 and the user control 110, the control unit 114 includes a surrounding housing 132. In the control unit 114, the fascia 116 is part of, mounted to or otherwise supported by the housing 132. Using the housing 132, the control unit 114 houses the circuit board 118 and the border assembly 120, including the light sources 124, the reflector 126 and the diffuser 128, concealed behind the fascia 116. The circuit board 118, the light sources 124 and the reflector 126 are fully concealed behind the fascia 116. On the other hand, the diffuser 128, with the border 112 rendered thereby exposed on the fascia 116, is partially concealed behind the fascia 116. In addition to housing the circuit board 118 and the border assembly 120, the control unit 114 supports the user control 110 on the fascia 116 for receiving user inputs.

The reflector 126 is reflective or otherwise non-transmissive or, in other words, configured to reflect or otherwise block light. The diffuser 128 is diffusively transmissive or, in other words, configured to diffusively transmit light. In a multipart implementation thereof, the reflector 126 and the diffuser 128 each have a one-shot injection molded or otherwise unitarily-formed construction. Alternatively, the reflector 126 and the diffuser 128 could have a two-shot injection molded or otherwise unitarily-formed construction. For instance, the reflector 126 may be made from one or more opaque polymeric materials suitable for injection molding, such as acrylonitrile butadiene styrene (ABS), polycarbonate (PC) and the like. For instance, the diffuser 128 may be made from one or more translucent polymeric materials suitable for injection molding, such as polymethyl methacrylate (PMMA) and the like.

Figure 2A:
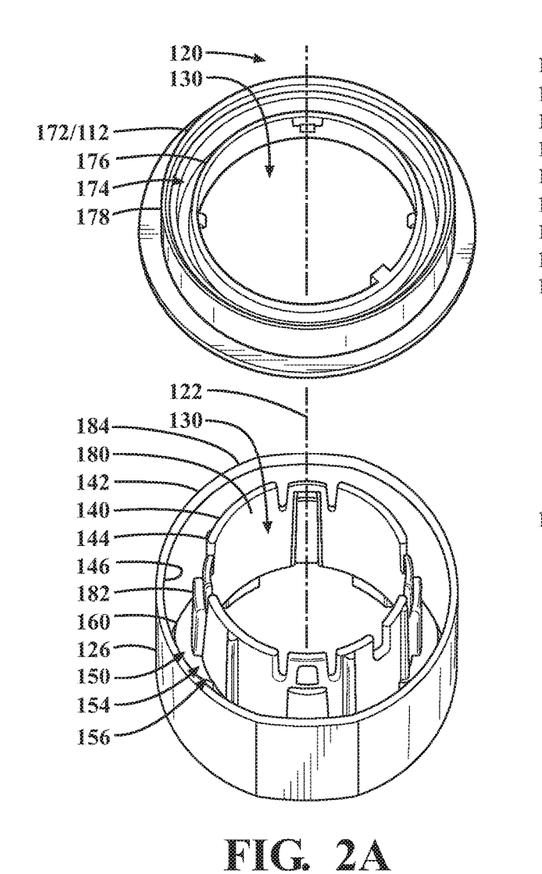
FIGS. 2A and 2B are partial assembly views of the control unit, showing the reflector and the diffuser.
Figure 2B:
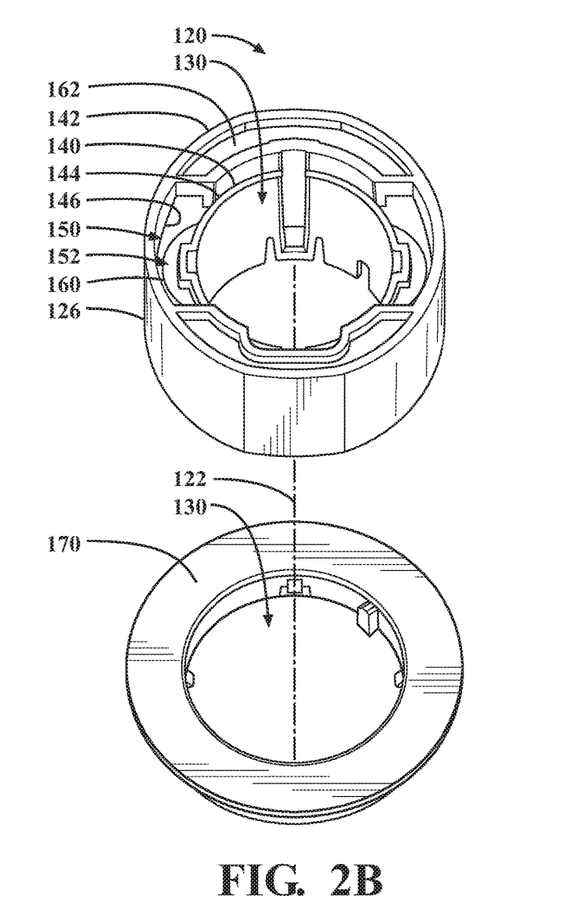

As shown with additional reference to FIGS. 2A and 2B, in a double wall configuration, the reflector 126 includes a tubular inner wall 140 whose inside forms the passage 130, and a surrounding tubular outer wall 142. The inner wall 140 includes an inner sidewall 144, and the outer wall 142 includes a surrounding outer sidewall 146. The overall inner wall 140 and the overall outer wall 142, and the overall inner sidewall 144 and the overall outer sidewall 146, are coaxially aligned with one another on the axis 122, and have a radially spaced relationship with one another. From their positions, as part of the reflector 126, in front of the light sources 124, the inner wall 140 and the inner sidewall 144 stand behind the light sources 124, and the outer wall 142 and the outer sidewall 146 stand around the light sources 124.

In the space between the inner sidewall 144 and the outer sidewall 146, the reflector 126 defines a cavity 150. The cavity 150 includes one or more backspaces 152 for the light sources 124, from where the light sources 124 emanate light. As shown, the cavity 150 includes multiple backspaces 152 that, to accommodate the light sources 124, are circumferentially-spaced about the axis 122, with the same circumferential spacing as the light sources 124. Moreover, the cavity 150 includes a continuous planar front exit 154 for the discharged light. With the inner wall 140 and the outer wall 142, and the inner sidewall 144 and the outer sidewall 146, standing therebetween, the backspaces 152 and the front exit 154 have an axially spaced relationship with one another along the axis 122. As shown, the front exit 154 includes a narrowed band 156 adjacent the outer sidewall 146 for concentrations of the discharged light.

In the cavity 150, the reflector 126 includes one or more blockers 160 for overhanging the light sources 124. To overhang the light sources 124, the blockers 160 extend, as part of the inner wall 140, from the inner sidewall 144 to overhang the backspaces 152. As part of the reflector 126, the blockers 160 have blocking positions with the emanated light. As shown, the reflector 126 includes multiple blockers 160 that, to assume blocking positions with the emanated light, are circumferentially-spaced about the axis 122, with the same circumferential spacing as the backspaces 152.

Moreover, the reflector 126 includes one or more webs 162 that, for structural purposes, interconnect the inner wall 140 and the outer wall 142. To interconnect the inner wall 140 and the outer wall 142, the webs 162 extend between the inner sidewall 144 and the outer sidewall 146. As part of the reflector 126, the webs 162 have non-blocking positions with the emanated light. As shown, the reflector 126 includes multiple webs 162 that, to assume non-blocking positions with the emanated light, are alternatingly circumferentially-spaced with the backspaces 152 about the axis 122.

The diffuser 128 includes a planar back face 170 and a front face 172 in an axially spaced relationship with one another along the axis 122. In the border assembly 120, the front face 172 renders the border 112. As shown, the diffuser 128 includes a front groove 174 for accommodating the user control 110. Relatedly, the diffuser 128 includes an inner body 176 and an outer body 178 separated by the front groove 174 that have a radially spaced relationship with one another on the axis 122. The outer body 178 includes the front face 172 and, accordingly, renders the border 112.

In the border assembly 120, with the reflector 126 behind the diffuser 128, the front exit 154 and the back face 170 are positioned over one another along the axis 122. As shown, the inner wall 140 includes a front portion 180, and the outside of the front portion 180 and the inside of the diffuser 128 are complementary to one another. Moreover, immediately behind the front portion 180, the inner wall 140 includes one or more front-facing shoulders 182, and the outer wall 142 ends in a front rim 184. Relatedly, the shoulders 182 and the front rim 184 have a radially aligned relationship with one another on the axis 122. With the fitment of the diffuser 128 about the front portion 180, the reflector 126 and the diffuser 128 assume axial alignment with one another along the axis 122. With the back face 170, moreover, axially backed to the shoulders 182 and the front rim 184, the reflector 126 and the diffuser 128 further assume axial positioning with one another along the axis 122. As shown, in association with assuming axial alignment and axial positioning with one another along the axis 122, the reflector 126 and the diffuser 128 include complementary features for anti-rotation registration with one another, as well as complementary features for snapped securement with one another.

With the reflector 126 and the diffuser 128 assuming axial alignment and axial positioning with one another along the axis 122, the front exit 154 and the back face 170 are left positioned over one another along the axis 122. Moreover, with the diffuser 128 including the inner body 176 and the outer body 178, the inner body 176 is left overhanging the inner sidewall 144, and the outer body 178 is left overhanging the outer sidewall 146. Relatedly, with the outer body 178 including the front face 172, and the front exit 154 including the narrowed band 156, the narrowed band 156 and the outer body 178 are left positioned over one another along the axis 122.

Figure 3A:
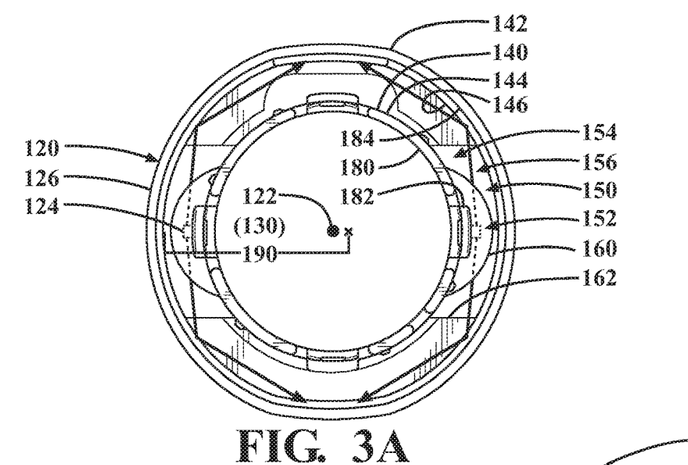
FIG. 3A is a front view of the border assembly with the diffuser removed for better viewing, showing, with reference to representative ray traces for reflections of the emanated light, aspects of the discharged light, including reflections of the emanated light along the reflector midway between the light sources.
Figure 3B:
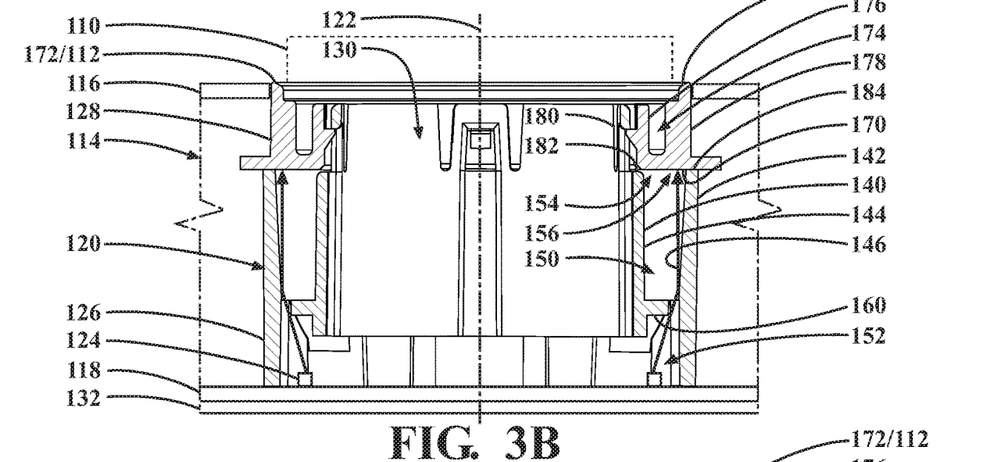
FIG. 3B is a cross-sectional view of the control unit along the line 3B-3B in FIG. 1B, showing, with reference to representative ray traces for reflections of the emanated light, aspects of the discharged light, including reflections of the emanated light being concentrated.
Figure 3C:
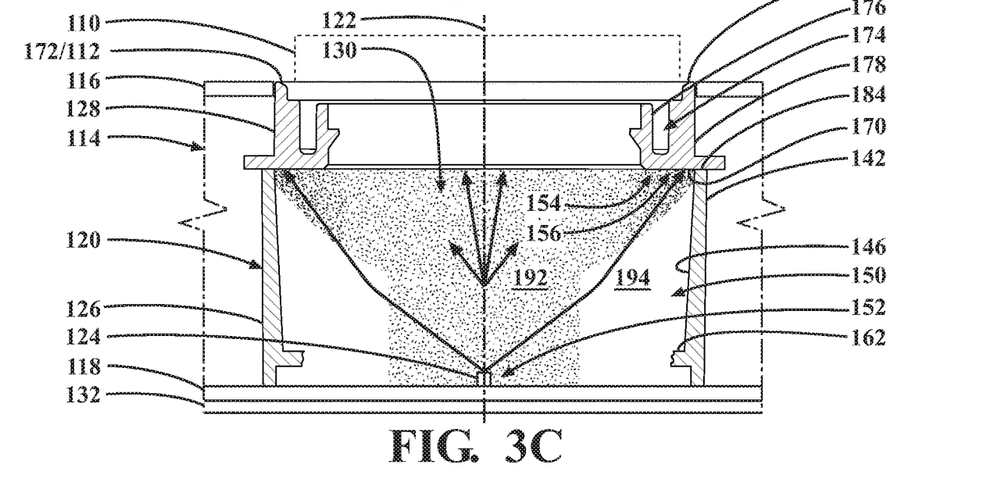
FIG. 3C is a cross-sectional view of the control unit along the line 3C-3C in FIG. 1B with an inner wall of the reflector removed for better viewing, showing, with reference to representative ray traces for reflections of the emanated light, aspects of the discharged light, including a combination of diffuse reflections of the emanated light and spectral reflections of the emanated light.

As shown with additional reference to FIGS. 3A, 3B and 3C, in the border assembly 120, the light sources 124, from their positions behind the reflector 126 in the backspaces 152, and using power from the circuit board 118, are operable to emanate light, through the cavity 150, onto the reflector 126, including onto the inner sidewall 144 and onto the outer sidewall 146. As shown, the light sources 124 are LEDs (i.e., light-emitting diodes) that, to emanate light onto the reflector 126, are operable to emanate light with cone-shaped emission patterns. In conjunction with the light sources 124 emanating light onto the reflector 126, the reflector 126, from its position in front of the light sources 124 and behind the diffuser 128, is configured to illuminate the diffuser 128 from behind using the emanated light. Specifically, the reflector 126 is configured to discharge light originating from the emanated light, including reflections of the emanated light off the outer sidewall 146, through the front exit 154 all along the reflector 126. Moreover, the reflector 126 is configured so that, all along the reflector 126, the discharged light has a regular intensity. With the back face 170 positioned over the front exit 154, the diffuser 128, from its position in front of the reflector 126, is configured to diffusively transmit the discharged light, resulting in the front face 172 casting a glow all along the diffuser 128. With the discharged light having a regular intensity, the glow has a regular intensity.

As shown, the configuration of the border assembly 120 and, more particularly, the configuration of the reflector 126, allows for a total of two light sources 124. In relation to the two light sources 124, the reflector 126 is represented by two mirror-image semi-tubular reflector segments for the light sources 124, and the diffuser 128 is represented by two mirror-image semi-tubular diffuser segments for the light sources 124. The reflector segments and the diffuser segments have like constructions, positions, positional relationships and configurations as the reflector 126 and the diffuser 128 to which they belong. In the reflector 126, the two reflector segments are back-to-back with one another and, following the tubular configuration thereof, form the reflector 126. The backspaces 152, the blockers 160 and the light sources 124, being along the reflector 126 thereat, are midway along the reflector segments. Relatedly, the reflector segments curve behind the backspaces 152, the blockers 160 and the light sources 124 to meet along the reflector 126 midway therebetween, peripherally along the reflector segments. Similarly, in the diffuser 128, the two diffuser segments are back-to-back with one another and, following the tubular configuration thereof, form the diffuser 128.

For each light source 124, reflector segment and diffuser segment, the light source 124, the reflector segment and the diffuser segment are configured, as part of the configuration of the border assembly 120, to contributorily promote the basic objective of the front face 172 casting the glow all along the diffuser 128 with a regular intensity. Among other things, it follows that, in the border assembly 120, the light source 124 is operable to emanate light, through the cavity 150, onto the reflector segment, including onto the inner sidewall 144 and onto the outer sidewall 146. In conjunction with the light source 124 emanating light onto the reflector segment, the reflector segment is configured to illuminate the diffuser segment from behind using the emanated light. Specifically, the reflector segment is configured to discharge light originating from the emanated light, including reflections of the emanated light off the outer sidewall 146, through the front exit 154 all along the reflector segment. For instance, the emanated light includes reflections of the emanated light off the outer sidewall 146 midway along the reflector segment, and peripherally along the reflector segment. Moreover, the reflector segment is configured so that, all along the reflector segment, the discharged light has a regular intensity. With the back face 170 positioned over the front exit 154, the diffuser segment, from its position in front of the reflector segment, is configured to diffusively transmit the discharged light, resulting in the front face 172 casting a glow all along the diffuser segment. With the discharged light having a regular intensity, the glow has a regular intensity.

As shown with particular reference to FIGS. 3A and 3B, to broadly regularize the intensity thereof, the discharged light includes only reflections of the emanated light, to the exclusion of the emanated light itself. As noted above, the light sources 124 are operable to emanate light onto the inner sidewall 144 and onto the outer sidewall 146. At the same time, the light sources 124 emanate light onward, between the inner sidewall 144 and the outer sidewall 146, toward the front exit 154. However, with the blockers 160 overhanging the light sources 124, the light sources 124, rather than emanating light onward through the front exit 154 to join the discharged light, emanate light onward onto the blockers 160. Accordingly, using the blockers 160, the reflector 126 is configured to block the emanated light from the front exit 154. Notwithstanding the blockers 160, the light sources 124 are free to emanate light inward onto the inner sidewall 144, outward around the blockers 160 onto the outer sidewall 146, and sideways around the blockers 160 onto the outer sidewall 146. Relatedly, the discharged light is free to include reflections of the emanated light. With the discharged light, however, including only reflections of the emanated light, the configuration of the reflector 126 reduces the prospect of irregular hotspots in the intensity of the discharged light midway along the reflector segments.

To broadly foster the discharged light reaching all along the reflector 126 and, more particularly, peripherally along the reflector segments, the discharged light, as noted above, includes reflections of the emanated light off the outer sidewall 146. Among other things, it follows that the outer sidewall 146 is reflective or, in other words, configured to reflect light. As noted above, the light sources 124 are free to emanate light inward onto the inner sidewall 144, outward onto the outer sidewall 146, and sideways onto the outer sidewall 146. Relatedly, the discharged light is free to include reflections of the emanated light. However, with the inner sidewall 144 standing behind the light sources 124, and the reflector segments curving behind the light sources 124, only the outer sidewall 146, from its position standing around the light sources 124, faces peripherally along the reflector segments. Specifically, the outer sidewall 146 faces peripherally along the reflector segments sideways from the light sources 124. Accordingly, with the light sources 124 emanating light sideways onto the outer sidewall 146, reflections of the emanated light off the outer sidewall 146 sideways from the light sources 124 join the discharged light peripherally along the reflector segments. With reflections of the emanated light joining the discharged light peripherally along the reflector segments, the configuration of the reflector 126 reduces the prospect of irregular drop-offs in the intensity of the discharged light peripherally along the reflector segments.

To further regularize the intensity thereof, the discharged light includes only reflections of the emanated light off the outer sidewall 146. As noted above, the light sources 124 are free to emanate light inward onto the inner sidewall 144. However, in the reflector 126, from the perspective of the inner sidewall 144 and the outer sidewall 146, the backspaces 152 and the light sources 124 are biased inward, toward the inner sidewall 144. With the blockers 160, moreover, extending from the inner sidewall 144 to overhang the light sources 124, reflections of the emanated light off the inner sidewall 144, rather than joining the discharged light, glance onto the blockers 160. Accordingly, using the blockers 160, the reflector 126 is configured to block reflections of the emanated light off the inner sidewall 144 from the front exit 154. With the discharged light including only reflections of the emanated light off the outer sidewall 146, the configuration of the reflector 126 reduces the prospect of irregular waviness in the intensity of the discharged light resulting from the combined contribution of both reflections of the emanated light off the inner sidewall 144 and reflections of the emanated light off the outer sidewall 146.

As shown with particular reference to FIG. 3B, to foster the contribution of the discharged light to the glow and, at the same time, regularize the intensity thereof, the discharged light is concentrated to the narrowed band 156. Specifically, reflections of the emanated light off the outer sidewall 146 are concentrated to the narrowed band 156. As noted above, with the outer body 178 including the front face 172, the narrowed band 156 and the outer body 178 are positioned over one another. As shown, the outer sidewall 146 is angled away from the backspaces 152 and the light sources 124. With the outer sidewall 146 angled away from the light sources 124, effectively more reflections of the emanated light off the outer sidewall 146 join the discharged light at the narrowed band 156. With effectively more reflections of the emanated light off the outer sidewall 146 joining the discharged light at the narrowed band 156, the discharged light is concentrated to the narrowed band 156, whereupon the outer body 178, rather than the inner body 176, diffusively transmits the discharged light. Accordingly, the discharged light contributes to the glow, rather than light leakage behind the fascia 116. With the discharged light contributing to the glow, rather than light leakage behind the fascia 116, the configuration of the reflector 126 reduces the prospect of irregular drop-offs in the intensity of the glow.

As shown with particular reference to FIG. 3A, to further foster the discharged light reaching all along the reflector 126 and, more particularly, peripherally along the reflector segments, the outer sidewall 146 has separate radii 190 along the reflector segments centered behind the axis 122. As noted above, the discharged light includes reflections of the emanated light off the outer sidewall 146 sideways from the light sources 124 that join the discharged light peripherally along the reflector segments. As shown, both the reflector segments and the diffuser segments are semicircular. The diffuser 128 is, relatedly, circular, with a radius centered on the axis 122. However, although semicircular along the reflector segments, the reflector 126 and, more particularly, the outer wall 142 and the outer sidewall 146, rather than being circular, are quasi-circular. Relatedly, rather than having one radius centered on the axis 122 and otherwise corresponding to the radius of the diffuser 128, the outer wall 142 and the outer sidewall 146 have separate, effectively larger radii 190 along the reflector segments that, from the perspectives thereof, are centered behind the axis 122. Accordingly, effectively more of the outer sidewall 146 faces peripherally along the reflector segments sideways from the light sources 124. Relatedly, with the light sources 124 emanating light sideways onto the outer sidewall 146, effectively more reflections of the emanated light off the outer sidewall 146 sideways from the light sources 124 join the discharged light peripherally along the reflector segments. With effectively more reflections of the emanated light joining the discharged light peripherally along the reflector segments, the configuration of the reflector 126 reduces the prospect of irregular drop-offs in the intensity of the discharged light peripherally along the reflector segments.

As shown with particular reference to FIG. 3C, to further regularize the intensity thereof, the discharged light includes a combination of diffuse reflections of the emanated light off the outer sidewall 146 and spectral reflections of the emanated light off the outer sidewall 146. As noted above, with the light sources 124 emanating light sideways onto the outer sidewall 146, the discharged light includes reflections of the emanated light off the outer sidewall 146 sideways from the light sources 124 that join the discharged light peripherally along the reflector segments. At the same time, with the light sources 124 also, as noted above, emanating light outward onto the outer sidewall 146, the discharged light includes reflections of the emanated light off the outer sidewall 146 outward from the light sources 124 that join the discharged light midway along the reflector segments. However, compared to sideways onto the outer sidewall 146, the light sources 124 emanate more light outward onto the outer sidewall 146. Specifically, the light sources 124 emanate light outward onto the outer sidewall 146 not only at higher densities and higher intensities, but also at higher angles of incidence having corresponding lower-loss reflection coefficients.

As shown, in relation to its reflective configuration, the outer sidewall 146 includes texturing 192 outward from the light sources 124, where the outer sidewall 146 is diffusively reflective or, in other words, configured to diffusively reflect light. With the outer sidewall 146 being diffusively reflective outward from the light sources 124, the discharged light includes diffuse reflections of the emanated light off the outer sidewall 146 outward from the light sources 124 that join the discharged light midway along the reflector segments. Accordingly, the intensity of reflections of the emanated light joining the discharged light midway along the reflector segments is dimmed. Moreover, the outer sidewall 146 includes mirroring 194 sideways from the light sources 124, where the outer sidewall 146 is spectrally reflective or, in other words, configured to spectrally reflect light. With the outer sidewall 146 being spectrally reflective sideways from the light sources 124, the discharged light includes spectral reflections of the emanated light off the outer sidewall 146 sideways from the light sources 124 that join the discharged light peripherally along the reflector segments. Accordingly, the intensity of reflections of the emanated light joining the discharged light peripherally along the reflector segments is maintained. With the intensity of reflections of the emanated light joining the discharged light peripherally along the reflector segments being maintained, and the intensity of reflections of the emanated light joining the discharged light midway along the reflector segments being dimmed, the configuration of the reflector 126 reduces the prospect of irregular hotspots in the intensity of the discharged light midway along the reflector segments resulting from the light sources 124 emanating comparatively more light outward onto the outer sidewall 146.

The front face 172 has been proven to cast the glow all along the diffuser 128 with a regular intensity that, for example, varies approximately 25% or less between highest and lowest intensity values. Advantageously, in addition to the basic objective of the front face 172 casting the glow all along the diffuser 128 with a regular intensity, the configuration of the border assembly 120 collaboratively promotes a number of other objectives. For instance, with the double wall configuration thereof, the reflector 126 is only tasked with simple reflections of the emanated light, as opposed to total internal reflections thereof. The reflector 126 is, moreover, only tasked with single-glance reflections of the emanated light to join the discharged light. Specifically, it is contemplated that multiple-glance reflections of the emanated light to join the discharged light, if any, would have a negligible contribution thereto resulting from the combination of low angles of incidence and the effect of multiple glances compounding the corresponding high-loss reflection coefficients. Without the need to manage either total internal reflections or multiple-glance reflections of the emanated light, opportunities are opened to not only minimize the geometric complexity of the reflector 126, but also minimize the number of light sources 124 to the total of two.

Moreover, with the reflector 126, as the precursor to the front face 172 casting the glow all along the diffuser 128, discharging light originating from the emanated light through the front exit 154 all along the reflector 126, there is no need for compensatory diffusive transmission of the discharged light. Without the need for compensatory diffusive transmission thereof, the diffuser 128 is only tasked with enough diffusive transmission of the discharged light to result in the front face 172 casting the glow. Accordingly, opportunities are opened to minimize the size of the diffuser 128.

Additionally, or alternatively, to minimizing the size of the diffuser 128, opportunities are opened to configure the diffuser 128 to diffusively transmit the discharged light substantially without color shift. For instance, in one implementation of the border assembly 120, the light sources 124 may reliably establish the color of the glow cast by the front face 172. Specifically, the light sources 124 are white, blue, red or otherwise colored, and operable to emanate light having a white, blue, red or other color, as the case may be. Moreover, the reflector 126, in relation to the discharged light, is configured to maintain the color of the emanated light. Relatedly, the diffuser 128 is uncolored. With its uncolored configuration, when the diffuser 128 is unilluminated from behind, the front face 172 appears frosted, milky white or otherwise translucent. On the other hand, with the reflector 126 illuminating the diffuser 128 from behind using the emanated light, the front face 172 appears to turn the color of the light sources 124. Specifically, with the diffuser 128 diffusively transmitting the discharged light substantially without color shift, the front face 172 casts the glow having a color the same as or otherwise corresponding to the color of the discharged light and, by extension, the color of the emanated light.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A border assembly, comprising:
   a semi-tubular reflector segment, the reflector segment including an inner sidewall and an outer sidewall, and a cavity therebetween, the cavity including a backspace midway along the reflector segment and a front exit spaced therefrom, the reflector segment configured, in relation to light emanated from the backspace, to discharge light originating from the emanated light through the front exit all along the reflector segment with a regular intensity, the discharged light including reflections of the emanated light off the outer sidewall; and
   a semi-tubular diffuser segment in front of the reflector segment, the diffuser segment including a back face positioned over the front exit and a front face spaced therefrom, the diffuser segment configured to diffusively transmit the discharged light, resulting in the front face casting a glow.

2. The border assembly of claim 1, wherein the discharged light includes only reflections of the emanated light.

3. The border assembly of claim 1, wherein the reflector segment includes a blocker in the cavity, the blocker overhanging the backspace to block the emanated light from the front exit, whereby the discharged light includes only reflections of the emanated light.

4. The border assembly of claim 1, wherein the discharged light includes only reflections of the emanated light off the outer sidewall.

5. The border assembly of claim 1, wherein the outer sidewall is angled away from the backspace, and the front exit includes a narrowed band adjacent the outer sidewall, whereby the reflections of the emanated light off the outer sidewall are concentrated to the narrowed band.

6. The border assembly of claim 1, wherein the outer sidewall is semicircular along the reflector segment, and has a radius centered behind an axis of the border assembly, whereby peripherally along the reflector segment, the discharged light includes reflections of the emanated light off the outer sidewall.

7. The border assembly of claim 1, wherein the discharged light includes a combination of diffuse reflections of the emanated light off the outer sidewall and spectral reflections of the emanated light off the outer sidewall.

8. The border assembly of claim 1, wherein peripherally along the reflector segment, the discharged light includes spectral reflections of the emanated light off the outer sidewall, and midway along the reflector segment, the discharged light includes diffuse reflections of the emanated light off the outer sidewall.

9. A control unit, comprising:
   a user control; and
   a border assembly for the user control, the border assembly including:
      a total of two light sources, the light sources operable to emanate light;
      a tubular reflector in front of the light sources, the reflector including an inner sidewall standing behind the light sources and an outer sidewall standing around the light sources, and a cavity therebetween, the cavity accommodating the light sources and including a front exit spaced therefrom, the reflector configured to discharge light originating from the emanated light through the front exit all along the reflector with a regular intensity, the discharged light including reflections of the emanated light off the outer sidewall; and
      a tubular diffuser in front of the reflector, the diffuser including a back face positioned over the front exit and a front face spaced therefrom rendering a border for the user control, the diffuser configured to diffusively transmit the discharged light, resulting in the front face casting a glow.

10. The control unit of claim 9, wherein the discharged light includes only reflections of the emanated light.

11. The control unit of claim 9, wherein the reflector includes blockers in the cavity, the blockers overhanging the light sources to block the emanated light from the front exit, whereby the discharged light includes only reflections of the emanated light.

12. The control unit of claim 9, wherein the discharged light includes only reflections of the emanated light off the outer sidewall.

13. The control unit of claim 9, wherein the outer sidewall is angled away from the light sources, and the front exit includes a narrowed band adjacent the outer sidewall, whereby the reflections of the emanated light off the outer sidewall are concentrated to the narrowed band.

14. The control unit of claim 9, wherein the outer sidewall is semicircular along back-to-back semi-tubular reflector segments forming the reflector, and has separate radii centered behind a circumferential spacing of the light sources, whereby along the reflector midway between the light sources, the discharged light includes reflections of the emanated light off the outer sidewall.

15. The control unit of claim 9, wherein the discharged light includes a combination of diffuse reflections of the emanated light off the outer sidewall and spectral reflections of the emanated light off the outer sidewall.

16. The control unit of claim 9, wherein along the reflector midway between the light sources, the discharged light includes spectral reflections of the emanated light off the outer sidewall, and along the reflector at the light sources, the discharged light includes diffuse reflections of the emanated light off the outer sidewall.

17. A border assembly, comprising:
a tubular reflector, the reflector including an inner sidewall and an outer sidewall, a cavity therebetween, and blockers in the cavity, the cavity including backspaces for accommodating a total of two light sources and a front exit spaced therefrom, the backspaces biased toward the inner sidewall, and the blockers extending from the inner sidewall to overhang the backspaces, the reflector configured, in relation to light emanated from the backspaces, to discharge light originating from the emanated light through the front exit all along the reflector with a regular intensity, wherein the blockers block the emanated light and reflections of the emanated light off the inner sidewall from the front exit, whereby the discharged light includes only reflections of the emanated light off the outer sidewall; and
a tubular diffuser in front of the reflector, the diffuser including a back face positioned over the front exit and a front face spaced therefrom, the diffuser configured to diffusively transmit the discharged light, resulting in the front face casting a glow.

18. The border assembly of claim 17, wherein:
the outer sidewall is angled away from the backspaces, and the front exit includes a narrowed band adjacent the outer sidewall, whereby the reflections of the emanated light off the outer sidewall are concentrated to the narrowed band; and
the diffuser includes a front groove, and an inner body and an outer body separated thereby, the outer body positioned over the narrowed band and including the front face, whereby the outer body is configured to diffusively transmit the discharged light.

19. The border assembly of claim 17, wherein the outer sidewall is semicircular along back-to-back semi-tubular reflector segments forming the reflector, and has separate radii centered behind a circumferential spacing of the backspaces, whereby along the reflector midway between the backspaces, the discharged light includes reflections of the emanated light off the outer sidewall.

20. The border assembly of claim 17, wherein the outer sidewall includes texturing outward from the backspaces and mirroring sideways from the backspaces, whereby along the reflector midway between the backspaces, the discharged light includes spectral reflections of the emanated light off the outer sidewall, and along the reflector at the backspaces, the discharged light includes diffuse reflections of the emanated light off the outer sidewall.

* * * * *